United States Patent [19]
Landgraf

[11] Patent Number: 4,748,345
[45] Date of Patent: May 31, 1988

[54] PULSE CONDITIONING CIRCUIT FOR CONTROLLING ELECTRICALLY CONTROLLABLE VALVES IN A HYDRAULIC CONTROL APPARATUS

[75] Inventor: Matthias Landgraf, Freiamt-Musbach, Fed. Rep. of Germany

[73] Assignee: Klöckner Ferromatik Desma GmbH, Malterdingen, Fed. Rep. of Germany

[21] Appl. No.: 35,874

[22] Filed: Apr. 8, 1987

[30] Foreign Application Priority Data

Apr. 16, 1986 [DE] Fed. Rep. of Germany ....... 3612713

[51] Int. Cl.$^4$ .............................................. H03K 5/08
[52] U.S. Cl. .................................... 307/268; 307/520; 328/34
[58] Field of Search ............... 363/265, 273, 282, 283; 307/268, 520; 328/34, 36, 65

[56] References Cited
U.S. PATENT DOCUMENTS

| 2,535,061 | 12/1950 | Grieg | 328/34 X |
| 3,596,208 | 7/1971 | Yerzley | 328/36 X |
| 3,790,894 | 2/1974 | Iizuka et al. | 328/34 X |
| 4,035,733 | 7/1977 | Morrow et al. | 328/34 |
| 4,297,595 | 10/1981 | Huellwegen | 307/268 |
| 4,565,931 | 1/1986 | Fumey | 307/268 X |
| 4,592,712 | 6/1986 | Gutjahr | 425/145 |
| 4,652,774 | 3/1987 | Hasegawa | 307/268 |

FOREIGN PATENT DOCUMENTS 3319268 9/1984 Fed. Rep. of Germany .

Primary Examiner—Patrick R. Salce
Assistant Examiner—Emanuel Todd Voeltz
Attorney, Agent, or Firm—Watson, Cole et al.

[57] ABSTRACT

Pulse conditioning device for electrically controlling valves in hydraulic control apparatus whereby a regulating signal is transmitted to the actuator of the respective electrically controllable valve. A filter is connected to the input side of an isolating transformer and a unidirectional rectifier is serially connected to an input side of the isolating transformer through the filter. An oscillator generates a sinusoidal output signal and a summing amplifier receives both the regulating signal and the sinusoidal signal to provide an output signal which is input to the unidirectional rectifier. To complete a modular pair of identical circuits for the control circuit, a second unidirectional rectifier is serially connected to a second filter and also connected to the output side of the isolating transformer. The second filter provides a zero offset compensation, and an output buffer amplifier is connected to the output of the second filter for producing an output signal which is the regulating signal for the actuator of the electrically controllable valve.

27 Claims, 3 Drawing Sheets

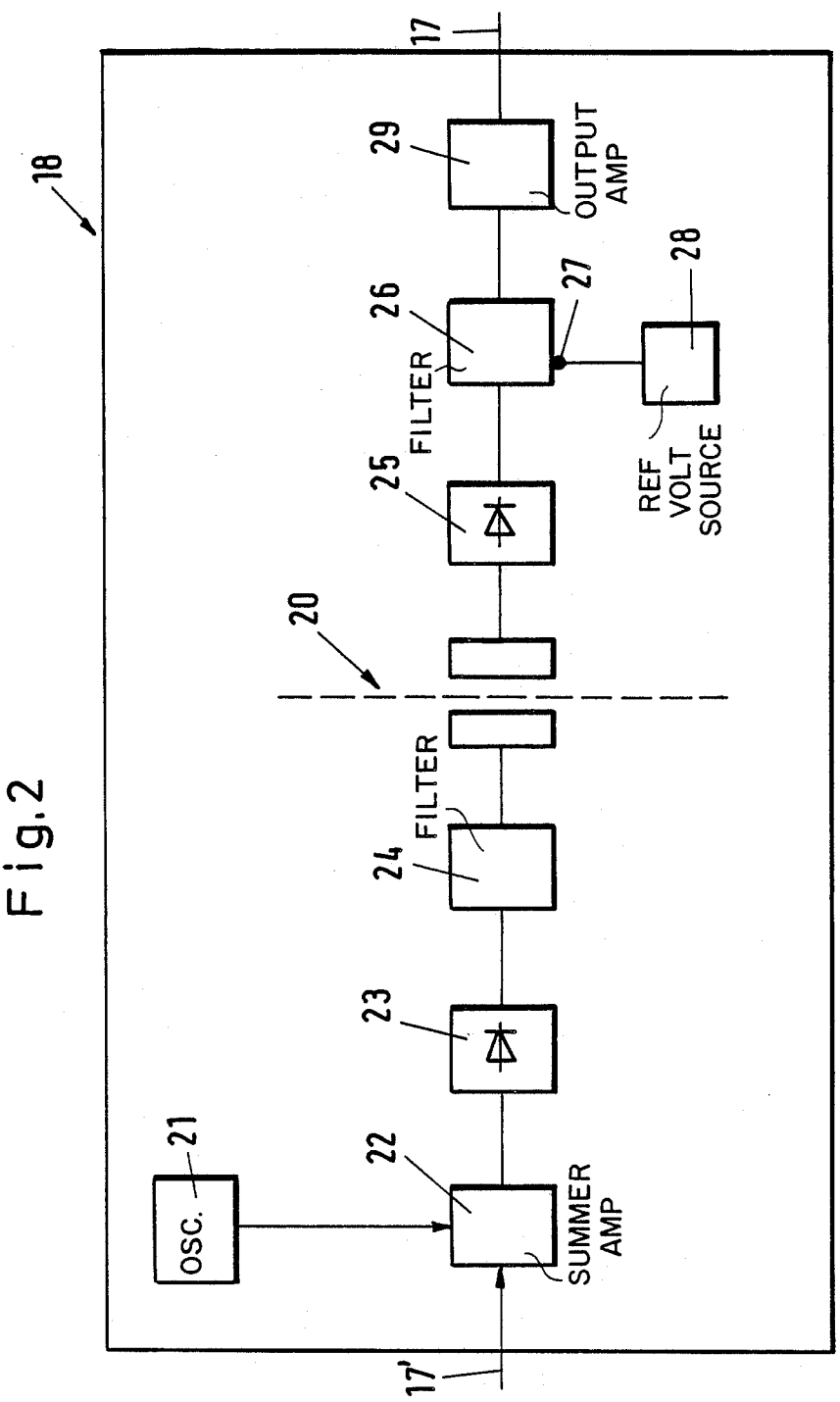

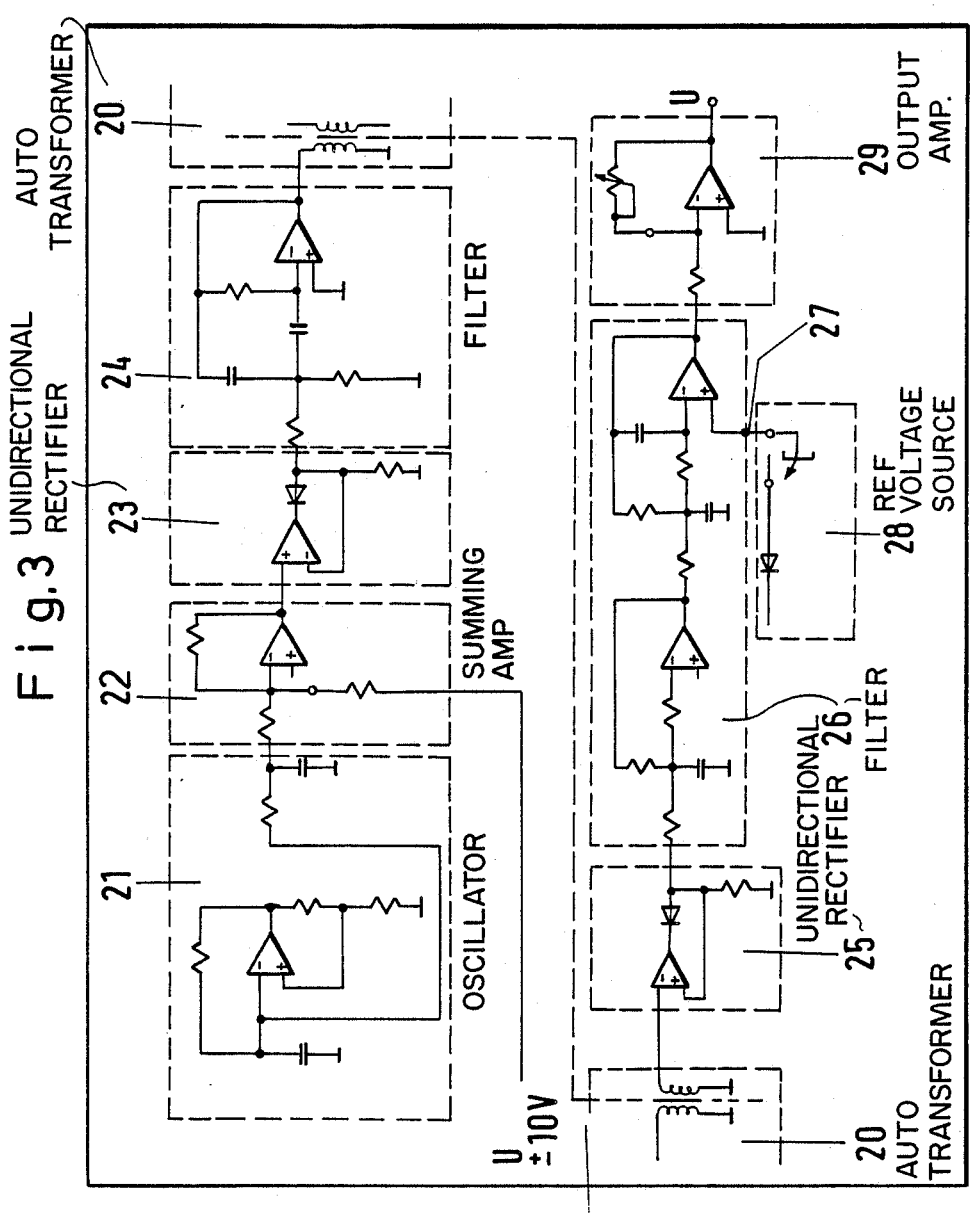

PULSE CONDITIONING CIRCUIT FOR CONTROLLING ELECTRICALLY CONTROLLABLE VALVES IN A HYDRAULIC CONTROL APPARATUS

CROSS-REFERENCE TO RELATED APPLICATION

This application relates to U.S. application Ser. No. 734,243, filed May 14, 1985 and now U.S. Pat. No. 4,592,712 issued June 3, 1986, and [DE] Fed. Rep. of Germany No. 3203763, the counterpart priority application thereof.

BACKGROUND OF THE INVENTION (1) Field of the Invention

The invention relates to a control or regulating device for electrically controlled valves in hydraulic control apparatus, particularly for relief valves in hydraulic control apparatus for injection molding machines whereby a regulating signal is transmitted to the actuator of the respective electrically controllable valve.

Generally, the control and regulating devices for electrically controllable valves in hydraulic control apparatus are constucted as a control center which transmits the regulating signals to these controllable valves. These control and regulating devices are generally at the same voltage level, i.e., they are voltaically coupled. If interference signals are triggered when addressing the electrically controllable valves, they interfere with the control or regulation due to the voltage coupling which can lead to malfunctions.

(2) Description of Related Art

Similar problems also appear in other areas of the technology, for example in the analogous communications technology. In that technology it is known to insert buffer amplifiers to obtain the voltage decoupling. In digital signal communication it is also known to use optical coupling, for example in digital signal transmission.

It is correspondingly also known to use optical couplers in digital control or regulating devices for hydraulic control apparatus in injection molding machines for addressing and controlling the directional valves. This type of digital control or regulating device for the hydraulic control of injection molding machines has to be initially designed for these optical couplers.

SUMMARY OF THE INVENTION

Though it is theoretically possible to design analogous control or regulating devices for hydraulic control apparatus, particularly for injection molding machines, with optical couplers, there is considerable technical effort required.

Until now it has not been possible to subsequently refit such analogous control or regulating devices to voltaic decouplers at an economical reasonable expense.

The invention is primarily directed to the problem of creating a control or regulating device of the type cited, supra, independently of its being used for analog or digital hydraulic controls, and with which, if needed, a conventional control or regulating device with voltaic coupling can be refitted as one with voltaic decoupling.

This problem is solved according to the invention by the control or regulating device having an isolating transformer and a filter with a serially-connected unidirectional rectifier serially connected to the input side of the isolating transformer such that the regulating signal and the sinusoidal output signal of an oscillator is input to a summing amplifier, the output signal of which is transmitted to the unidirectional rectifier.

Furthermore, another unidirectional rectifier is serially connected to the output side of the isolating transformer and to a filter connected to a summer circuit for executing a zero offset compensation, and then to an amplifier, the output signal of which is the regulating signal for the actuator of the electrically controllable valve.

The above-described arrangement has results in that in the usual non-analagous or digital control or regulating devices without voltaic decoupling, the circuit segment consisting of the above-mentioned circuit components is arranged in the control line to the respective electrically controllable valves, and voltaic separation of the circuit components is obtained in a simple and economical manner. It is thus no longer necessary to use in extreme situations, for example, buffer amplifiers as measuring devices which were designed for completely different purposes and the use of which cannot be economically justified for these areas of application.

Because of the techniques according to the invention, the output signal of the amplifier is a signal with a residual ripple, but surprisingly, it has been shown that this residual ripple has, in practical applications, no negative influence on the precision of the hydraulic control apparatus, particularly for injection molding machines and in cases in which relief valves with an oscillating valve body are used, for example as shown in German specification DBP No. 33 19 268. Moreover, the control trigger probability and the operating precision are considerably improved, while, for example, in measuring technology such a residual ripple leads to a nonreproduceable measuring result. As this residual ripple is completely irrelevant to the area of application to which the present invention is directed, the high technical efforts used to-date can be completely eliminated.

In another embodiment of the invention, the isolating transformer has a ferrite core. By such means the harmonic share of the regulating signal is reduced.

In still another embodiment of the invention, at least one of the unidirectional rectifiers is an active unidirectional rectifier. By such means a linearization of the rectifier characteristic is attained. This is necessary to further improve the identity between input and output signals of the control component according to the invention.

In yet another embodiment of the invention, the filters are active filters, also for the above-stated purpose.

In still another embodiment of the invention, the filter serially connected to the input side of the isolation transformer, is a critically damped filter, i.e., a filter which is damped in the range of the aperiodic borderline case. By this means the amplitude of the output signal of this filter agrees with that of the input signal thereto.

In yet another embodiment of the invention, the critically damped filter is a filter of the second order. This has the effect that the realization of the critical damping of the filter becomes considerably simpler where control technology is concerned.

In still another embodiment of the invention, the filter serially connected to the output of the isolating transformer is a Bessel filter, so that the step response of the buffer output amplifier is optimized.

In yet another embodiment of the invention, the Bessel filter is a filter of the fourth order. Thus, it is assured that there is obtained, for practical applications, sufficient interference voltage separation between the residual ripple and the desired signal.

In still another embodiment of the invention, the filter serially connected to the output of the isolating transformer is additionally constructed as a summer circuit, i.e., it simultaneously executes zero offset compensation. By this means, according to the invention, the input of the null voltage is independent of the setting of the amplification factor of the control arrangement.

BRIEF DESCRIPTION OF THE DRAWINGS

The above objects, advantages and features of the invention are readily apparent from the following description of a preferred embodiment representing the best mode of carrying out the invention when taken in conjunction with the following drawings, wherein:

FIG. 2 is a block diagrammatic representation of an embodiment of the control circuitry according to the invention shown as a modular pair of identical circuits; and FIG. 3 is schematic representation of the moudlar pair of identical circuits of FIG. 2 showing the electronic control elements of the various operational circuit blocks shown therein.

DETAILED DESCRIPTION OF THE PREFERRED EMBODIMENT

Figure 1:
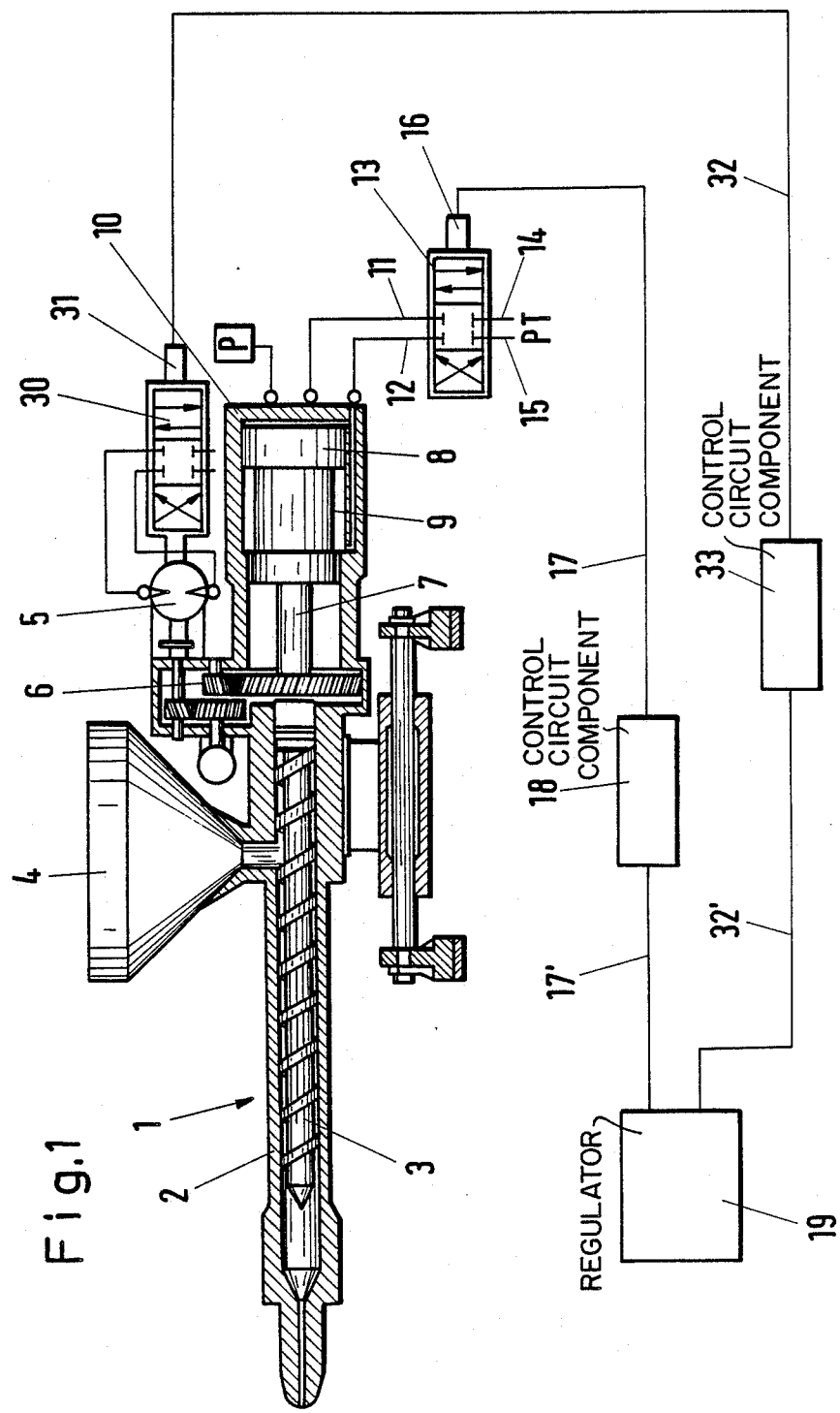
FIG. 1 is a schematic illustration of the plastification and injection unit of an injection molding machine with part of the hydraulic control apparatus shown in cross section, and the associated electrical control circuitry of the hydraulic regulating section.

FIG. 1 shows, in a schematic lateral view representation, a plastification and injection assembly for an injection molding machine, and also schematically shows the associated hydraulic control apparatus as well as the electric control or regulating device for the hydraulic control apparatus.

Plastification and injection assembly 1 which contains, in a known manner, plastification and injection cylinder 2 as well as plastification and injection screw 3. Plastification and injection screw 3 is, on the one hand, rotated by hydromotor 5 during the plastification of the granulative, thermoplastic synthetic material fed in through funnel 4, whereby the synthetic material is simultaneously axially shifted in the direction towards the right edge of the drawing. For this purpose, screw 3 is in contact with drive pinion 6 of hydromotor 5 through a generally known keyway shaft connection (not shown). Plastification and injection screw 3 is also connected by means of piston rod 7 with piston 8, within cylinder 9 of hydraulic working cylinder 10, which can be activated from both sides by means of two hydraulic lines 11 and 12. After plastification of the synthetic material, spiral piston 3 is moved axially in the opposite direction by a corresponding activation of hydraulic piston 8, to inject the plastified material into a mold receptacle which is not shown. Two hydraulic lines 11 and 12 are connected through 4/3 directional valve 13, by a line 14 to tank (T) (not shown) by the tank or pressure line 15 to the hydraulic pump (not shown). 4/3 directional valve 13 is electrically precontrolled and, for such purpose, has precontrol valve 16 which receives the control signal with voltaic separation from electric control or regulator device 19 through control line 17' and control circuit component 18 according to the invention. In case the voltaic separation should be stopped, control line 17 can be directly connected to electrical control or regulator device 19 while bypassing control circuit component 18.

FIG. 2 shows the modular pair of identical circuits of the control circuitry (control circuit component 18) according to the invention. The isolating transformer is schematically designated by 20. The dot-dash line symbolically indicates voltaic separation.

Oscillator 21 emits a sinusoidal output signal and, together with control signal 17' emitted by control or regulating device 19 of precontrol valve 16, is input to the inputs of summing amplifier 22, to which active unidirectional rectifier 23 is serially connected. The output signal of active unidirectional rectifier 23 is input to filter 24 which, in the present case, is a critically-damped bandpass filter of the second order, the output signal of which feeds the input side of isolating transformer 20.

Serially connected to the output side of isolating transformer 20, is active or passive unidirectional rectifier 25, which, in turn, is followed by Bessel filter 26 of the fourth order. Bessel filter 26 has a summing input 27 for the connection of reference voltage source 28. Serially connected to the output of Bessel filter 26 is output amplifier 29, the signal output of which is connected through control line 17 as a control signal to precontrol valve 16.

A zero offset compensation is obtained, if necessary, using voltage source 28, through summing input 27 of Bessel filter 26. As this is done independently of the setting of output amplifier 29, it is possible, except for the residual ripple of the output signal of Bessel filter 26, to create an output signal which is identical to the input signal sent through line 17, i.e., that the control signal of the electrical control or regulating device 19, is input to precontrol valve 16 in a voltaically separated manner.

In a corresponding manner to that described and with respect to FIG. 1, supra, the control signal for 4/3 directional valve 30 of hydromotor 5 can be voltaically decoupled, 4/3 directional valve 30 with electrical precontrol valve 31 is connected through control line 32 and control circuit component 33 (for voltage decoupling), identical to control circuit component 18 and line 32' to electrical control or regulating device 19.

FIG. 3 is a schematic representation of the modular pair of identical circuits of FIG. 2 showing the electrical control elements of the various operational circuit blocks shown therein. The structure and operation of each of oscillator 21, summer amplifier 22, unidirectional rectifier 23, filter 24, autotransformer 20, unidirectional rectifier 25, filter 26, reference voltage source 28 and output buffer amplifier 29 is known to those skilled in the art to which the invention is directed. Consequently, there is no need to describe in detail such structure and operation other than that which is illustrated in FIG. 3 to enable the invention to be practiced.

The control arrangement according to the invention has the added advantage that it can also be used for digital control and regulating devices for electrically controlled valves of hydraulic control apparatus.

The analog or digital control or regulating device for electrically controllable valves according to the invention can be installed in all hydraulic control apparatus in which the residual ripple of the voltaically separated control signal can be ignored, i.e., the device according to the invention is basically applicable in all areas of machine construction.

The components used with the control or regulating device are individually known to those skilled in the art of electrically controllable valves and control technology. The above-described embodiments of the invention are intended to be only illustrative of the invention to enable the invention to be practiced. Various modifications and alterations will be apparent to those skilled in the electrically controllable valve and control technology art to which the invention is directed. The invention is not intended to be limited by, or to, the specific embodiments described herein, but to be accorded the full range of equivalents of the elements and components set forth in the appended claims.

What is claimed is:

1. Pulse conditioning device for electrically controllable valves in hydraulic control apparatus whereby a regulating signal is transmitted to the actuator of the respective electrically controllable valve, comprising:
   an isolating transformer and a filter connected to the input side thereof and further comprising a unidirectional rectifier serially connected to an input side of said isolating transformer through said filter;
   an oscillator for generating a sinusoidal output signal;
   a summing amplifier receiving said regulating signal and said sinusoidal output signal and providing an output signal which is input to said unidirectional rectifier;
   said pulse conditioning device further comprising a second unidirectional rectifier serially connected to a second filter and connected to the output side of said isolating transformer;
   said second filter executing a zero offset compensation; and
   an amplifier connected to the output of said second filter for producing an output signal which is said regulating signal for the actuator of the electrically controllable valve.

2. Pulse conditioning device for electrically controllable valves in hydraulic control apparatus according to claim 1, wherein said isolating transformer has a ferrite core.

3. Pulse conditioning device for electrically controllable valves in hydraulic control apparatus according to claim 1, wherein at least one of said unidirectional rectifiers is an active unidirectional rectifier.

4. Pulse conditioning device for electrically controllable valves in hydraulic control apparatus according to claim 3, wherein said active unidirectional rectifier has a linear characteristic.

5. Pulse conditioning device for electrically controllable valves in hydraulic control apparatus according to claim 1, wherein said filter and said second filter are active filters.

6. Pulse conditioning device for electrically controllable valves in hydraulic control apparatus according to claim 2, wherein said filter and said second filter are active filters.

7. Pulse conditioning device for electrically controllable valves in hydraulic control apparatus according to claim 3, wherein said filter and said second filter are active filters.

8. Pulse conditioning device for electrically controllable valves in hydraulic control apparatus according to claim 4, wherein said filter and said second filter are active filters.

9. Pulse conditioning device for electrically controllable valves in hydraulic control apparatus according to claim 5, wherein said filter is a critically damped filter.

10. Pulse conditioning device for electrically controllable valves in hydraulic control apparatus according to claim 9, wherein said critically damped filter is a filter of the second order.

11. Pulse conditioning device for electrically controllable valves in hydraulic control apparatus according to claim 1, wherein said second filter is a Bessel filter.

12. Pulse conditioning device for electrically controllable valves in hydraulic control apparatus according to claim 2, wherein said second filter is a Bessel filter.

13. Pulse conditioning device for electrically controllable valves in hydraulic control apparatus according to claim 3, wherein said second filter is a Bessel filter.

14. Pulse conditioning device for electrically controllable valves in hydraulic control apparatus according to claim 4, wherein said second filter is a Bessel filter.

15. Pulse conditioning device for electrically controllable valves in hydraulic control apparatus according to claim 5, wherein said second filter is a Bessel filter.

16. Pulse conditioning device for electrically controllable valves in hydraulic control apparatus according to claim 6, wherein said second filter is a Bessel filter.

17. Pulse conditioning device for electrically controllable valves in hydraulic control apparatus according to claim 7, wherein said second filter is a Bessel filter.

18. Pulse conditioning device for electrically controllable valves in hydraulic control apparatus according to claim 11, wherein said Bessel filter is a filter of the fourth order.

19. Pulse conditioning device for electrically controllable valves in hydraulic control apparatus according to claim 1, wherein said second filter additionally functions as a summer circuit.

20. Pulse conditioning device for electrically controllable valves in hydraulic control apparatus according to claim 11, wherein said second filter additionally functions as a summer circuit.

21. Pulse conditioning device for electrically controllable valves in hydraulic control apparatus according to claim 12, wherein said second filter additionally functions as a summer circuit.

22. Pulse conditioning device for electrically controllable valves in hydraulic control apparatus according to claim 13, wherein said second filter additionally functions as a summer circuit.

23. Pulse conditioning device for electrically controllable valves in hydraulic control apparatus according to claim 14, wherein said second filter additionally functions as a summer circuit.

24. Pulse conditioning device for electrically controllable valves in hydraulic control apparatus according to claim 15, wherein said second filter additionally functions as a summer circuit.

25. Pulse conditioning device for electrically controllable valves in hydraulic control apparatus according to claim 16, wherein said second filter additionally functions as a summer circuit.

26. Pulse conditioning device for electrically controllable valves in hydraulic control apparatus according to claim 17, wherein said second filter additionally functions as a summer circuit.

27. Pulse conditioning device for electrically controllable valves in hydraulic control apparatus according to claim 18, wherein said second filter additionally functions as a summer circuit.

* * * * *